UNITED STATES PATENT OFFICE.

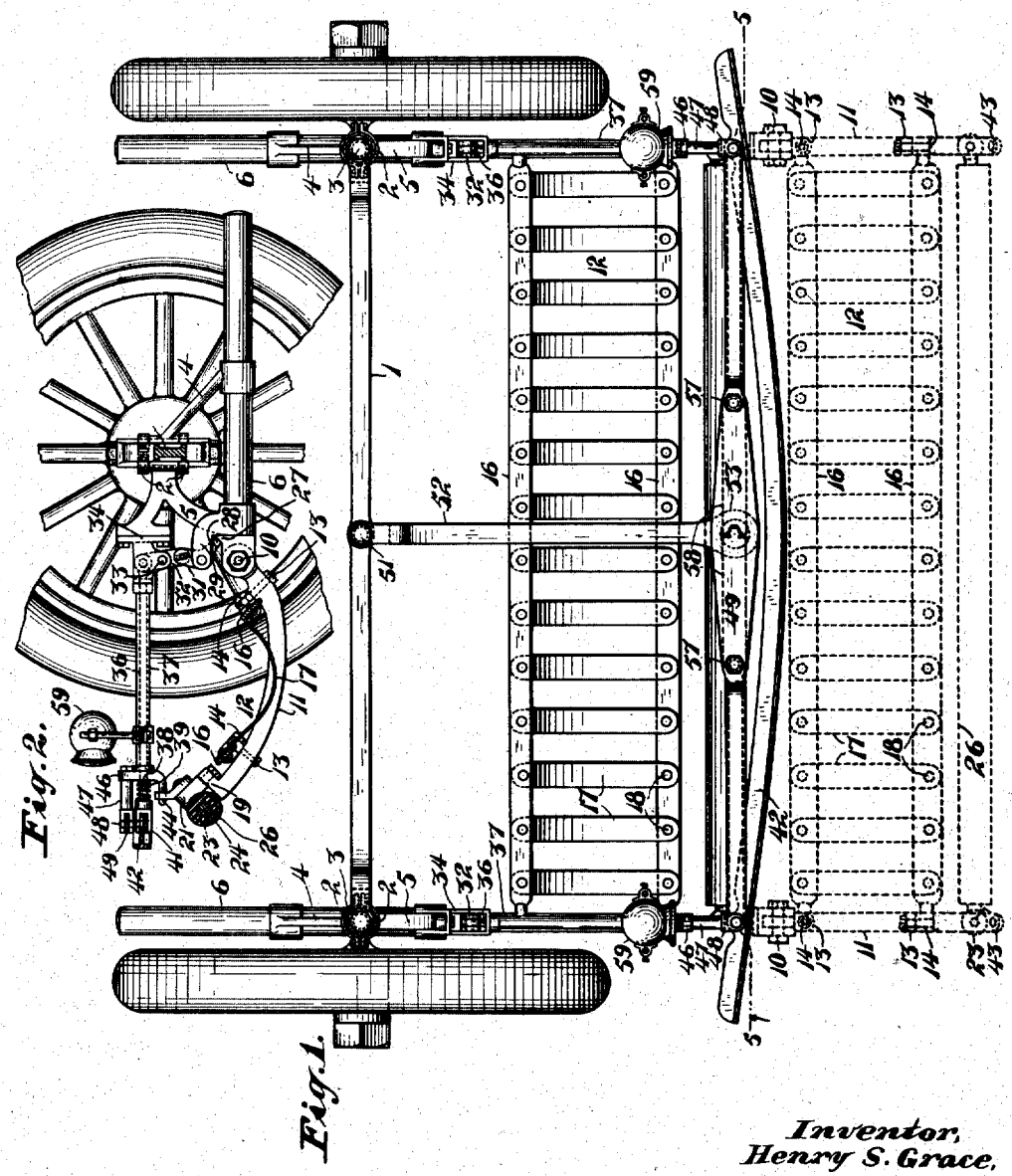

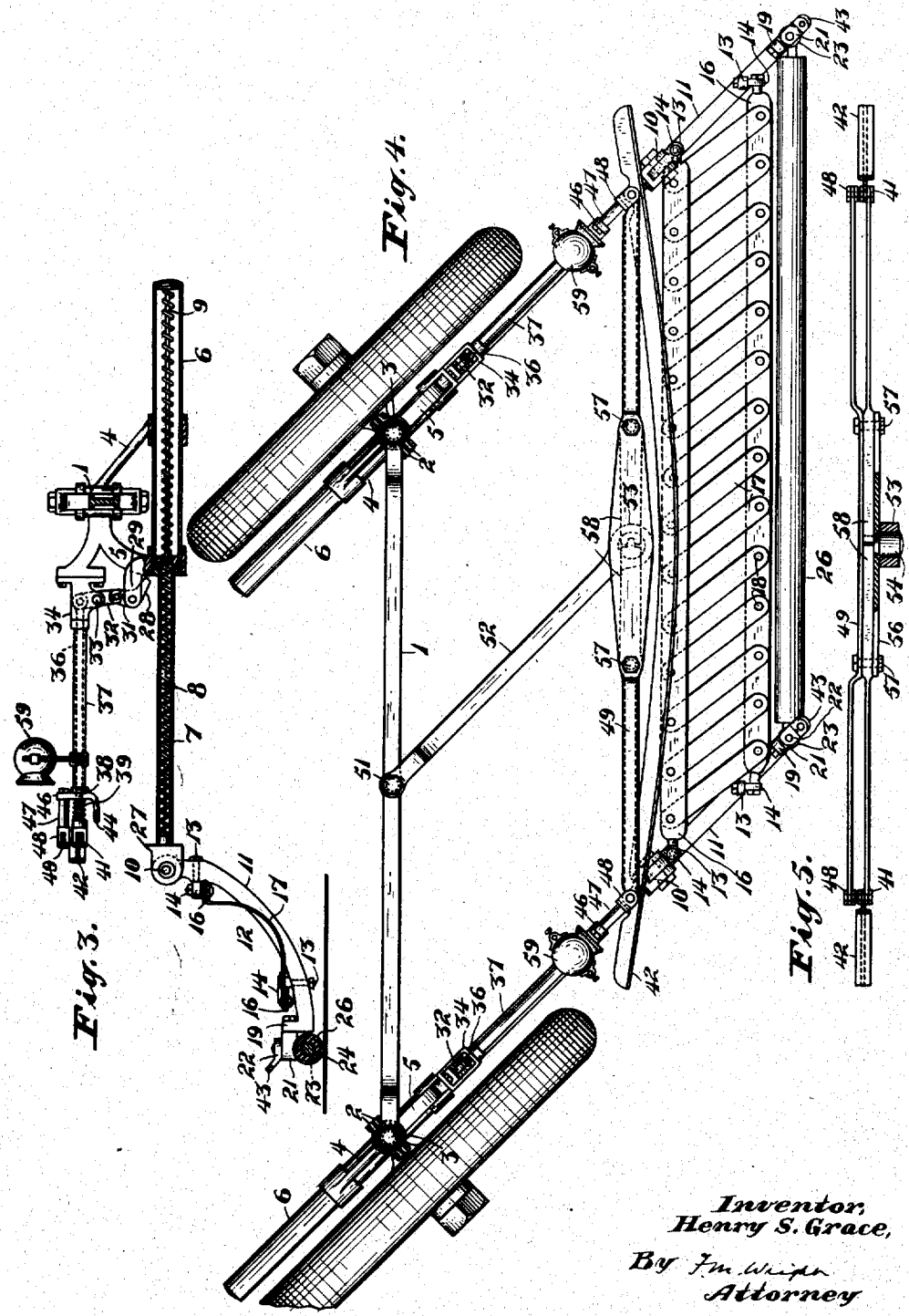

HENRY S. GRACE, OF SAN FRANCISCO, CALIFORNIA.

CAR-FENDER.

1,212,762.  Specification of Letters Patent.  Patented Jan. 16, 1917.

Application filed April 5, 1916. Serial No. 89,126.

*To all whom it may concern:*

Be it known that I, HENRY S. GRACE, a citizen of the United States, residing at San Francisco, in the county of San Francisco and State of California, have invented new and useful Improvements in Car-Fenders, of which the following is a specification.

One object of the present invention is to provide a fender for automobiles and street cars which will be automatically operated by impact against a person or object in front of the automobile or street car, and, when so operated, will be projected to catch the person and prevent him from being run over by the automobile or street car.

A further object is to provide a fender, which, when the automobile or street car is traveling in a curve, will extend in the direction in which the front or steering wheels are traveling and not in the direction toward which the front of the body of the car is pointed.

A further object is to provide an improved shock absorber.

A further object is to provide means whereby the support for the fender can also be utilized as a support for the head-lights.

A further object is to provide means for supporting head-lights which will move with the front or steering wheels when traveling in a curve.

In the accompanying drawing, Figure 1 is a plan view of a front portion of an automobile equipped with my invention, certain parts in an extended position, being shown in dotted lines; Fig. 2 is a broken longitudinal section of the same; Fig. 3 is a longitudinal section of the same, the parts being in a different position from that shown in Fig. 2; Fig. 4 is a plan view of the same, the parts being in a different position from that shown in Fig. 1; Fig. 5 is a sectional view on the line 5—5 of Fig. 1.

I shall herein illustrate and describe the invention as applied to an automobile, but it will be understood that, with slight obvious changes, it can also be applied to the front of a street car.

Referring to the drawing, 1 indicates the front axle of an automobile. Secured by removable bands 2 to the spindle bodies 3 carried at the ends of said axle, are rearwardly and downwardly extending arms 4, and forwardly and downwardly extending arms 5. Carried by the lower ends of said arms, at each side of the machine, and extending parallel with the wheels is a horizontal tubular guideway 6, in which can slide a tube 7, a compressed spring 8 being contained in said guideway and tube between the closed front end of the tube, and the closed rear end of the guideway, said spring being coiled around a rod 9 secured at its rear end to the rear end of the guideway. To the front ends of said tubes 7 are pivoted, as shown at 10, the curved end members 11 of a fender 12, having eye bolts 13 extending upwardly through the ends of said end members, eye-bolts 14 extending forwardly through the eyes of the eye-bolts 13, and parallel transverse members 16, the ends of which are reduced and threaded and extend through the eyes of said eye-bolts 14 and secured by nuts on their outer threaded ends. Said fender also comprises curved longitudinally extending members 17 pivoted at their ends, as shown at 18, to the transverse members. Through upward extensions 19 from the front ends of the end members are secured forwardly directed eye-bolts 21, in which are secured, by nuts 22, downwardly directed eye-bolts 23, in which eye-bolts 23 is pivotally mounted the shaft 24 of a roller 26 of rubber. Said tubes 7 are held in their retracted position against the pressure of said springs 8 by means of lips 27 extending upwardly from the front ends of the tubes 7 and engaged by rearwardly and downwardly extending dogs 28 pivoted on forward extensions 29 from the forwardly and downwardly extending arms 5, said dogs being formed integral with forked upwardly extending arms 31 loosely pivoted to levers 32, pivoted, as shown at 33, to upward and forward extensions 34 from said spindle bodies 3, the upper ends of said levers 32 having forked ends between which are pivoted the rear ends of rods 36, which slide longitudinally in tubular extensions 37 from said extensions 34, and are formed at their front ends with shoulders 38, between which and the front ends of the tubes are compressed springs 39 coiled around the rods 36. The front ends of said rods carry, in front of said shoulders 38, forked heads 41, in which are secured terminal portions of a curved bumper or shock absorber 42 extending transversely of the machine. In the normal position of this bumper the compressed coiled springs 39 press the rods 36 forwardly, so that the levers 32 extend vertically, and therefore the upper ends of the arms 31 also extend vertically, while the dogs 28 extend downwardly and rearwardly in front of the lips 27 and press downwardly upon the front portions of the tubes 7. The forward movement of the tubes 7, under the action of the springs 8, is thus rendered impossible since such forward movement would necessarily be accompanied by a further downward movement of the dogs 28. When, however, the bumper is pressed rearwardly against the pressure of the coiled springs 39, the dogs 28 are moved upwardly and rearwardly, thereby withdrawing them from the lips 27 and permitting the tubes 7 to be pressed forward by the springs 8.

When the fender is in its rear position, and the lips 27 on the tubes 7 are engaged by the dogs 28, the front portion of the fender is held in an elevated position by means of apertured forward extensions 43 from the nuts 22, which are supported by fingers 44 extending forwardly and depending from the front ends of said tubes 37. When the bumper is pushed rearwardly, to withdraw the dogs from the lips, to permit the compressed springs 8 to advance the tubes 7 and the fender, the rear end of which is supported by said rods 7, the apertured extensions 43 slide from off the front ends of the fingers 44 and the front end of the fender immediately drops to the ground, at the same time that it is pushed forward in front of the bumper.

It is important that the part of the fender which strikes a person in front of the car, that is to say, the bumper, should extend in front of the front wheels of the car. But, by the above-described construction, if a person should be struck by that part of the bumper which extends in front of either front wheel of the car, that is to say, outside of the tubular extensions 37, the result would be that, while the nearer rod 36 would be pushed in by impact of the bumper against said person, the tendency would be to draw the farther rod 36 outward from the tubular extension 37 and consequently the farther end of the fender would not be released from the dog. To obviate this result there are erected on the front ends of the tubes short uprights 46 having apertured tops, through which extend in a forward direction bolts 47, having forked members 48 immediately over the forked heads 41 of the rods 36, between the forks of which heads are pivotally secured the ends of a cross beam 49. The front axle 1 is formed at the center with a housing for a vertical bolt 51, which passes not only through the front axle, but also through the rear forked end of a forwardly extending bar 52, having at its forward end a cylindrical portion 53 in which is pivotally mounted a stud 54 depending from a transversely extending plate 56, said plate being located immediately beneath the central portion of the beam 49. The ends of this plate are connected to said central portion of the beam by vertical pivot bolts 57, on which are pivoted, between the plate and the beam, equalizing levers 58, the inner ends of which have, the one a tooth, and the other a recess to receive said tooth, so that both of said inner ends move forwardly or rearwardly together. The outer ends of said levers are received within the forks of forked heads 41 of the rods 36 and are loosely pivoted to said rods, so that said rods also move inwardly or outwardly in unison with each other. By reason of the provision of the equalizing levers 58, meshing with one another at their inner ends, and pivoted on a rigid beam 49, it results that, if either end of the bumper, outside of the rods 36, is struck by an object in front, both of said rods 36 will be moved inwardly, withdrawing both dogs 28 from the lips 27.

Since the tubes 37 always extend in the direction in which the front wheels are moving, I take advantage of this arrangement to support on the front portions of said tubes head-lights 59, which thus, however the front wheels are turned, always reflect the light in the direction in which the automobile is moving.

I claim:—

1. In combination with a vehicle, a fender mounted to move transversely on the front end of the vehicle, and means for projecting said fender forwardly automatically by impact of a part thereof against an object in front of the car.

2. In combination with a vehicle, a fender mounted thereon to swing about a vertical axis, and means for projecting said fender forwardly automatically by impact of a part thereof against an object in front of the car.

3. In combination with the front wheels of a vehicle, said wheels being turnable about vertical axes, a fender, a support therefor, means for projecting said fender forwardly from its normal position on said support, and means whereby said fender can move transversely with the turning of the wheels about vertical axes.

4. In combination with the front wheels of a vehicle, said wheels being turnable about vertical axes, a fender, a support therefor, means for projecting said fender forwardly from its normal position on said support, and means whereby said fender can swing about a vertical axis with the turning of said wheels about vertical axes.

5. In combination with a wheeled vehicle, a fender, and means for movably supporting said fender upon a central and two terminal vertical axes closely adjacent to the front wheels of the vehicle.

6. In combination with a wheeled vehicle, a fender, and parallel bars for movably supporting said fender upon a central and two terminal vertical axes closely adjacent to the front wheels of the vehicle.

7. In combination with a wheeled vehicle, a fender, and parallel bars for movably supporting the front portion of said fender upon a central and two terminal vertical axes closely adjacent to the front wheels of the vehicle.

8. In combination with a vehicle having wheels which can turn about vertical axes with reference to the body of the vehicle, a fender, supports for said fender located at each side of the vehicle, said fender being pivotally supported by front supports to turn about vertical axes, the rear supports being supported by parts connected with the vehicle wheels.

9. In combination with an automobile having its front wheels mounted on spindles, the bodies of which can turn about vertical axes, guideways supported upon said bodies, devices movable in said guideways, springs for projecting said devices from said guideways, a fender, the rear portion of which is supported upon said devices, means for locking said devices to prevent their projection by said springs, a bumper movably supported upon said spindle bodies, and means whereby the repression of said bumper removes said locking means.

10. In combination with an automobile having its front wheels mounted on spindles, the bodies of which can turn about vertical axes, guideways supported upon said bodies, tubes movable in said guideways, springs in said guideways and tubes for projecting said tubes from said guideways, a fender, the rear portion of which is supported upon said tubes, means for locking said tubes to prevent their projection by said springs, a bumper movably supported upon said spindle bodies, and means whereby the repression of said bumper removes said locking means.

11. In combination with an automobile having its front wheels mounted on spindles, the bodies of which can turn about vertical axes, guideways supported upon said bodies, devices movable in said guideways, springs for projecting said devices from said guideways, a fender, the rear portion of which is supported upon said devices, means for locking said devices to prevent their projection by said springs, a bumper, means supported upon said spindle bodies for movably supporting said bumper, a front portion of said fender being detachably supported upon said last-named means, and means whereby the repression of said bumper removes said locking means.

12. In combination with an automobile having its front wheels mounted on spindles, the bodies of which can turn about vertical axes, guideways supported upon said bodies, tubes movable in said guideways, springs in said guideways and tubes for projecting said tubes from said guideways, a fender, the rear portion of which is supported upon said tubes, means for locking said tubes to prevent their projection by said springs, a bumper, means supported upon said spindle bodies for movably supporting said bumper, a front portion of said fender being detachably supported upon said last-named means, and means whereby the repression of said bumper removes said locking means.

13. A fender for a vehicle comprising a bumper, means for guiding said bumper rearwardly, said bumper extending at each end beyond said guiding means, a cross beam connecting the forward ends of said guiding means, and levers pivoted on said cross beam and having intermeshing inner ends, said outer ends being pivotally connected to said bumper.

14. A fender for a vehicle movable transversely with a parallel movement and comprising a bumper, means for guiding said bumper rearwardly, said bumper extending at each end beyond said guiding means, a cross beam connecting the forward ends of said guiding means, and levers pivoted on said cross beam and having intermeshing inner ends, said outer ends being pivotally connected to said bumper.

15. In combination with a vehicle having front wheels turnable about vertical axes, a fender movable transversely with a parallel movement, and comprising a rearwardly movable bumper, means for suitably supporting said fender, and means whereby the rearward movement of one end of the bumper correspondingly moves rearwardly its other end.

16. In combination with a vehicle having front wheels turnable about vertical axes, a fender movable transversely with a parallel movement and comprising a bumper, means for guiding said bumper rearwardly, said bumper extending at each end beyond said guiding means, a cross beam connecting the forward ends of said guiding means, and levers pivoted on said cross beam and having intermeshing inner ends, said outer ends being pivotally connected to said bumper.

In testimony whereof I have hereunto set my hand in the presence of two subscribing witnesses.

HENRY S. GRACE.

Witnesses:
A. J. HENRY,
F. M. WRIGHT.

Copies of this patent may be obtained for five cents each, by addressing the "Commissioner of Patents, Washington, D. C."